United States Patent
Katoh et al.

(10) Patent No.: US 6,575,150 B2
(45) Date of Patent: Jun. 10, 2003

(54) IGNITION TIMING CONTROL DEVICE FOR INTERNAL COMBUSTION ENGINE

(75) Inventors: Hiroshi Katoh, Yokohama (JP); Ritsuo Sato, Yokohama (JP); Masahiko Yuya, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/216,173

(22) Filed: Aug. 12, 2002

(65) Prior Publication Data

US 2003/0034008 A1 Feb. 20, 2003

(30) Foreign Application Priority Data

Aug. 15, 2001 (JP) ........................................ 2001-246499

(51) Int. Cl.$^7$ .................................................. F02P 9/00
(52) U.S. Cl. ..................... 123/609; 123/594; 123/406.5
(58) Field of Search ............................... 123/406.5, 594, 123/609, 610, 611

(56) References Cited

U.S. PATENT DOCUMENTS 4,367,722 A * 1/1983 Mizuno ........................ 123/644
4,380,989 A * 4/1983 Takaki ......................... 123/644

FOREIGN PATENT DOCUMENTS

| JP | 2000-45841 | 2/2000 |
| JP | 2000-240489 | 9/2000 |
| JP | 2001-82302 | 3/2001 |

OTHER PUBLICATIONS

U.S. patent application Ser. No. 10/218,112, Yuya et al., filed Aug. 14, 2002.
U.S. patent application Ser. No. 10/217,515, Sato et al., filed Aug. 14, 2002.
U.S. patent application Ser. No. 10/216,384, Yuya et al., filed Aug. 12, 2002.
U.S. patent application Ser. No. 10/216,385, Sato et al., filed Aug. 12, 2002.

* cited by examiner

Primary Examiner—Bibhu Mohanty
(74) Attorney, Agent, or Firm—Foley & Lardner

(57) ABSTRACT

In order to improve the control characteristics for ignition timing during transient operating conditions including engine startup, during engine transient operating conditions, a controller (1) sets an advance limit ADVLMT restricting the maximum value of the ignition timing advance to a limit ADMLMTS which is a large value when compared to the value for steady-state operating conditions. Furthermore during transient operating conditions, the dwell angle TDWLLB is also increased and the correlation of the ignition timing control with respect to a suitable ignition timing is improved.

11 Claims, 18 Drawing Sheets

IGNITION TIMING CONTROL DEVICE FOR INTERNAL COMBUSTION ENGINE

FIELD OF THE INVENTION

This invention relates to ignition timing control for an internal combustion engine.

BACKGROUND OF THE INVENTION

JP-A 2001-82302 published by the Japanese Patent Office in 2001 discloses a control device which uses rotation speed as a parameter in order to calculate an ignition timing.

The ignition timing is calculated and set on the basis of successive REF signals defining a reference position of the crankshaft. The REF signals comprise a detection signal from a crank angle sensor. As a result, particularly when starting the engine, during transient operating states in which the engine rotation speed increases rapidly from a low rotation speed in a short period, the fluctuation in the rotation speed between the interval of the input of REF signals increases, consequently the problem arises that a required ignition advance can not be obtained.

SUMMARY OF THE INVENTION

The dimension of the advance per ignition signal control cycle is restricted by an advance limit. If the engine rotation speed reaches a certain speed and the advance per control cycle is increased, there is the possibility that misfiring will occur due to an insufficient current-carrying angle (dwell angle) in the primary current. This result may be prevented by restricting the advance by providing an advance limit. However during large fluctuations in the rotation speed, it is not possible to perform an advancing operation up to an optimal ignition timing (for example, an MBT minimum advance for best torque) due to the limit on the advance. As a result, optimal combustion conditions can not be realized.

Furthermore if the engine rotation speed is represented as a REF signal, and in particular, when the REF signal comprises a long time interval such as that during startup, the deviation of the actual rotation speed from the rotation speed calculated using the REF signal increases and generally the rotation speed appears to decrease. Consequently the generated torque may be reduced due to the fact that the calculated ignition timing tends to act as a retard on the optimal ignition timing. Alternatively, the generated torque may be reduced as a result of the calculated current-carrying time shortening relative to an optimal current-carrying time and thus resulting in a reduction in the ignition energy.

Decreases in torque during transient operating states result in adverse effects on performance and in particular, constitute a cause of adverse effects on exhaust emission control and startability during startup conditions.

It is therefore an object of this invention to enable rapid advancing operations up to a suitable ignition timing during transient operating states including engine startup.

In order to achieve the above object the invention provides an ignition control device for an internal combustion engine, the internal combustion engine comprises a spark plug provided in a combustion chamber and an ignition coil supplying an ignition current to the spark plug, the ignition coil controlling an ignition current supplied to the spark plug based on a supplied primary current. The ignition control device comprises a first sensor detecting a rotation speed of the engine crankshaft, a second sensor detecting a transient operating state of the engine; and a controller. The controller functions to determine a transient engine operating state based on the output of the second sensor; calculate the basic ignition timing based on the rotation speed; set an advance limit which is the maximum value of the advance on the ignition timing to a different value during a transient operating state and during a steady-state operating state, the value during a transient operating state being the larger value; set the ignition timing by using the limit to restrict the advance on the basic ignition timing, the basic ignition timing being calculated based on the rotation speed; calculate a dwell angle comprising the period of application of an ignition current in response to the rotation speed; and control the primary current supplied to the ignition coil based on the ignition timing and the dwell angle.

The details as well as other features and advantages of the invention are set forth in the remainder of the specification and are shown in the accompanying drawings.

DESCRIPTION OF THE PREFERRED EMBODIMENTS

Figure 1:
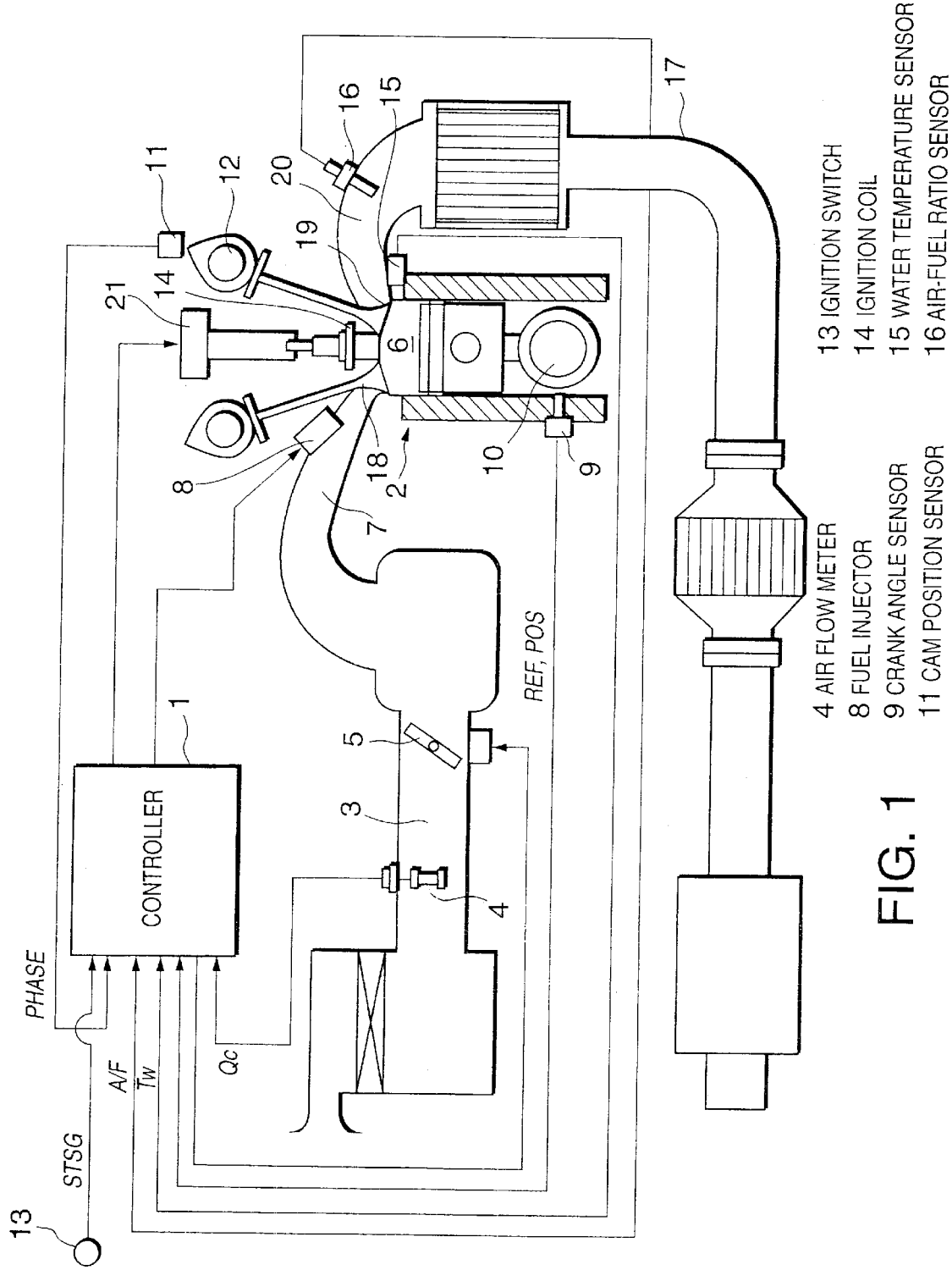
FIG. 1 is a schematic figure of an internal combustion engine adapting this invention.

Referring to FIG. 1, a four-cylinder gasoline engine 2 for a vehicle is provided with an exhaust pipe 17 and an air intake pipe 3. The air intake pipe 3 is connected to the air intake ports 7 for the respective cylinders. A fuel injector 8 for injecting fuel into each cylinder is provided in the air intake port 7. The air intake port 7 is connected to the combustion chamber 6 and is opened and closed by an air intake valve 18.

A spark plug 14 is provided in the combustion chamber 6 and ignites and combusts a gaseous mixture of air and fuel injected by the fuel injector 8. An ignition current from an ignition coil 21 is supplied to the spark plug 14.

The combustion chamber 6 is connected to an exhaust port 20. An exhaust valve 19 is provided to open and close the exhaust port 20. Combustion gas combusted in the combustion chamber 6 is discharged from the exhaust port 20 and flows into the exhaust pipe 17.

A controller 1 is provided in order to control the ignition timing of the spark plug 14 and the injection amount of fuel from the fuel injector 8. The controller 1 comprises a microcomputer provided with a central processing unit (CPU), a read only memory (ROM), a random access memory (RAM) and an input/output interface (I/O interface). The controller 1 controls the ignition of the spark plug 14 and the fuel injection of the fuel injector 8 based on various types of signals representing the operating state of the engine.

For this purpose, signals are inputted to the controller 1 from an air flow meter 4 which detects an intake air amount Qc from the air intake pipe 3, a water temperature sensor 15 which detects a cooling water temperature Tw of the engine 2, an air-fuel ratio sensor 15 which detects an air-fuel ratio A/F of the gaseous mixture based on the oxygen concentration in the exhaust gas, a crank angle sensor 9 which detects the rotation position of the crankshaft 10 of the engine 2 and a cam position sensor 11 which detects a specific rotation position of a cam 12 driving the exhaust valve 19 in each cylinder. Respective detection signals from the ignition switch 13 are also inputted into the controller 1.

The crank angle sensor 9 is a crank angle sensor for detecting an engine rotation speed and a rotational angle of the crankshaft 10 and outputs POS signal and REF signals in the form of a pulse. The POS signal is outputted per unit rotational angle of the crankshaft 10, for example at a period of 1 deg. The REF signal is outputted at a pre-set reference position of the crankshaft 10.

The ignition switch 13 outputs different signals depending on an operating position and outputs an ignition signal IGN to the controller 1 and a starter signal STSG which activates a starter motor.

The cam position sensor 11 is a cam position sensor for detecting a rotation position of a cam shaft 12 and outputs a pulse PHASE signal in the form of a pulse when the cam shaft 12 reaches a pre-set rotation position.

Figure 2:
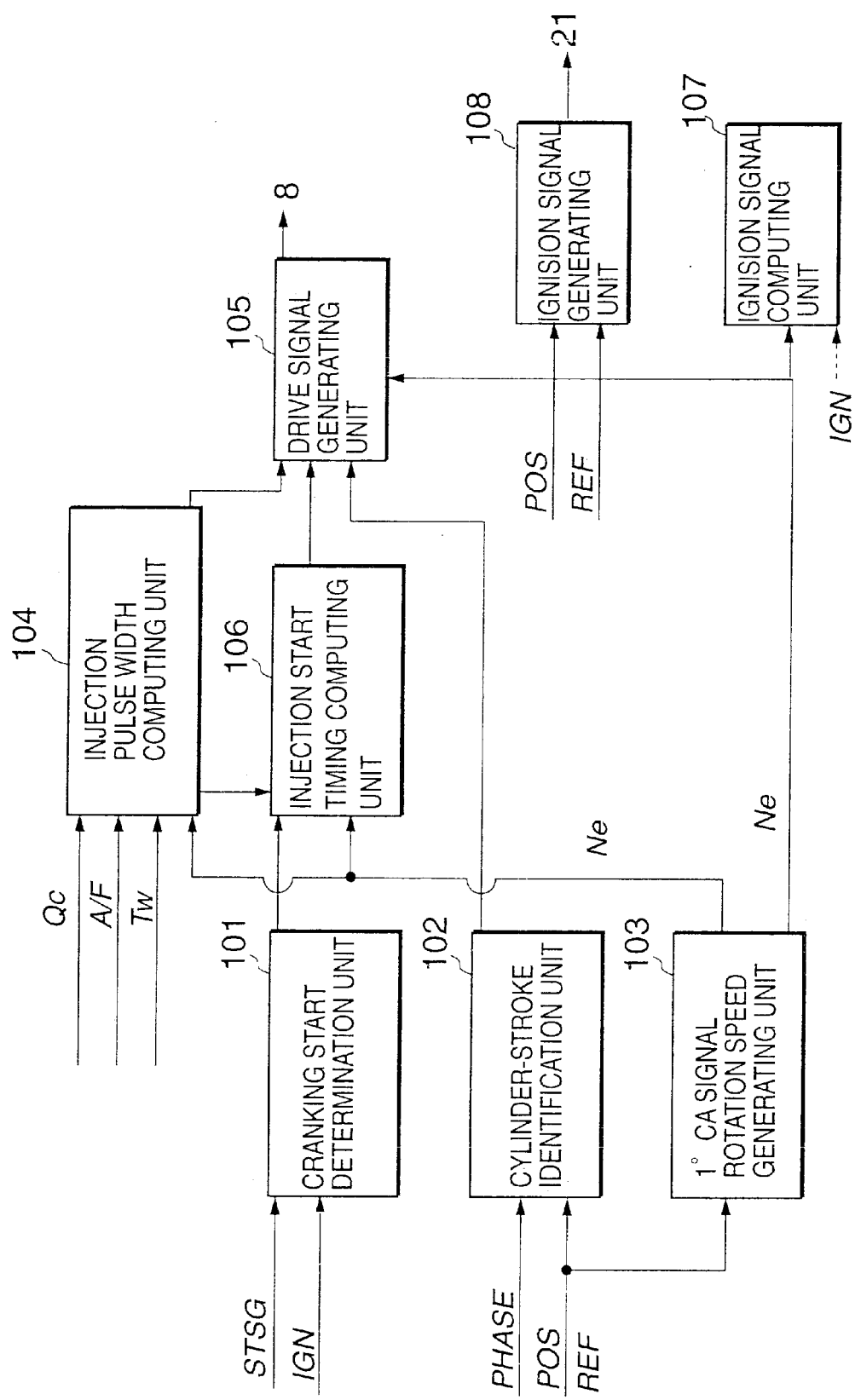
FIG. 2 is a block diagram describing the functions of a controller according to this invention.

FIG. 2 shows the functions of the controller 11 related to fuel injection control and ignition control.

The controller 1 is provided with a cranking determination unit 101, cylinder-stroke identification unit 102, a rotation speed calculation unit 103, an injection pulse width calculation unit 104, a drive signal output unit 105, an injection start timing calculation unit 106, an ignition signal output unit 107 and an ignition signal calculation unit 108.

The cranking determination unit 101 determines cranking startup based on the starter signal STSG and the ignition signal ING from the ignition switch 13. The cylinder-stroke identification unit 102 determines the position and stroke of each cylinder of the engine 2 based on the PHASE signal from the cam position sensor 11 and the POS signal from the crank angle sensor 9. The rotation speed calculation unit 103 calculates the rotation speed Ne of the engine based on the generation period of the POS signal and the REF signal. The injection pulse width calculation unit 104 calculates the basic fuel injection pulse width by looking up a table based on the intake air amount Qc detected by the air flow meter 4 and the calculated engine rotation speed Ne. Various types of corrections are added to the basic fuel injection amount based on the air-fuel ratio A/F of the exhaust gas detected by the air-fuel ratio sensor 16 or the water temperature signal Tw detected by the water temperature sensor 15. In this manner, an injection amount command value is determined in order to drive the engine 2 at a target air-fuel ratio. The injection start timing calculation unit 106 determines the start timing for fuel injection in response to fuel injection conditions.

The drive signal output unit 105 outputs a drive signal to the fuel injector 8 based on the injection amount command value and the injection start timing.

The ignition signal calculation unit 108 calculates the ignition timing and the dwell angle using the rotation speed calculated from the POS signal and the REF signal. The ignition signal output unit 107 outputs a primary current to the ignition coil 21 according to the dwell angle and the ignition timing calculated by the ignition signal calculation unit 108 by referring to the REF signal and the POS signal. The ignition coil 21 supplies the spark plug 14 with an ignition current by producing a high-voltage secondary current based on the primary current. The spark plug 14 performs an ignition operation when supplied with the ignition current and ignites and combusts the air-fuel mixture in the combustion chamber 6.

Figure 3:
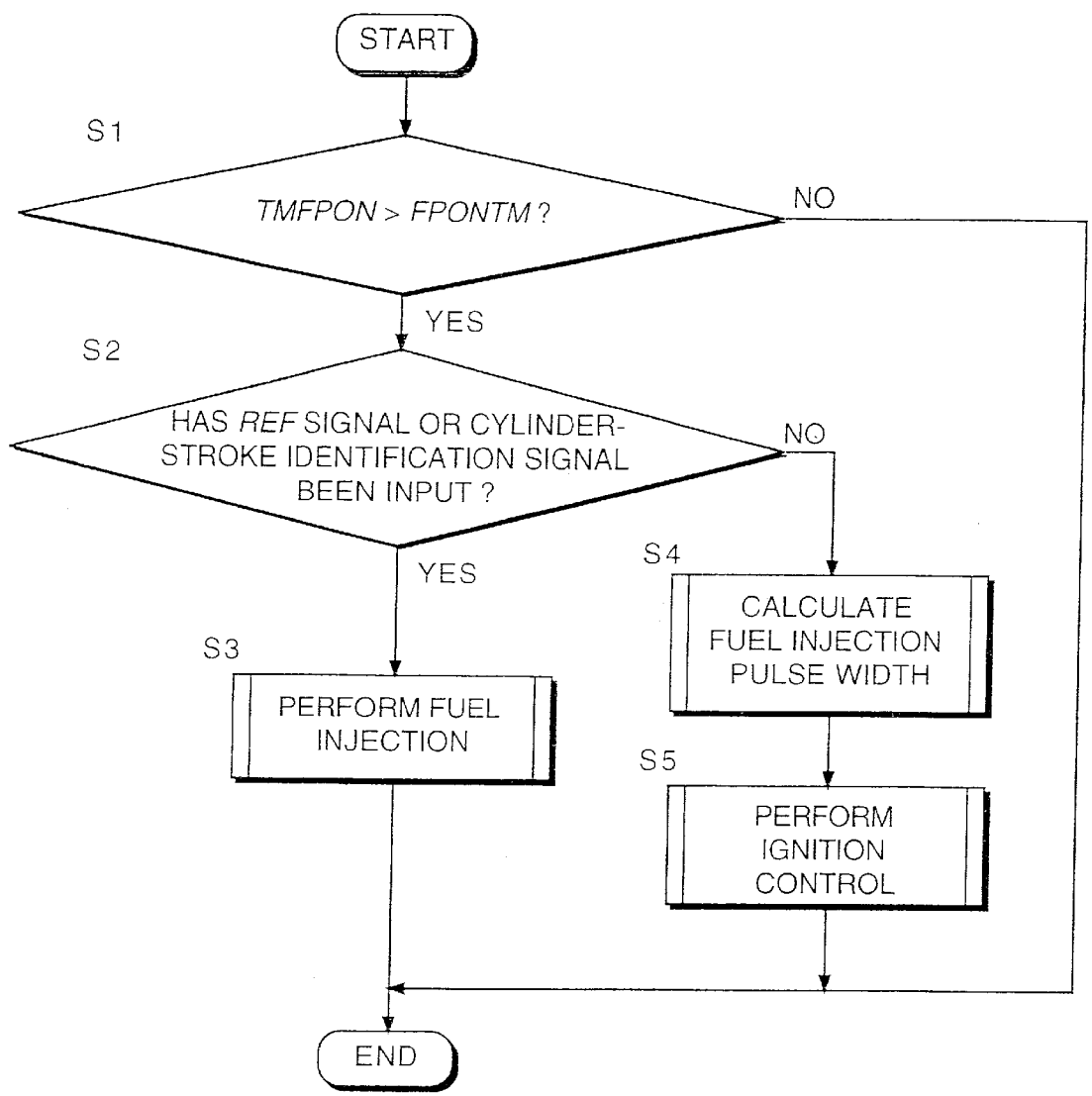
FIG. 3 is a flowchart of a main control routine for startup fuel injection control performed by the controller.
Figure 4:
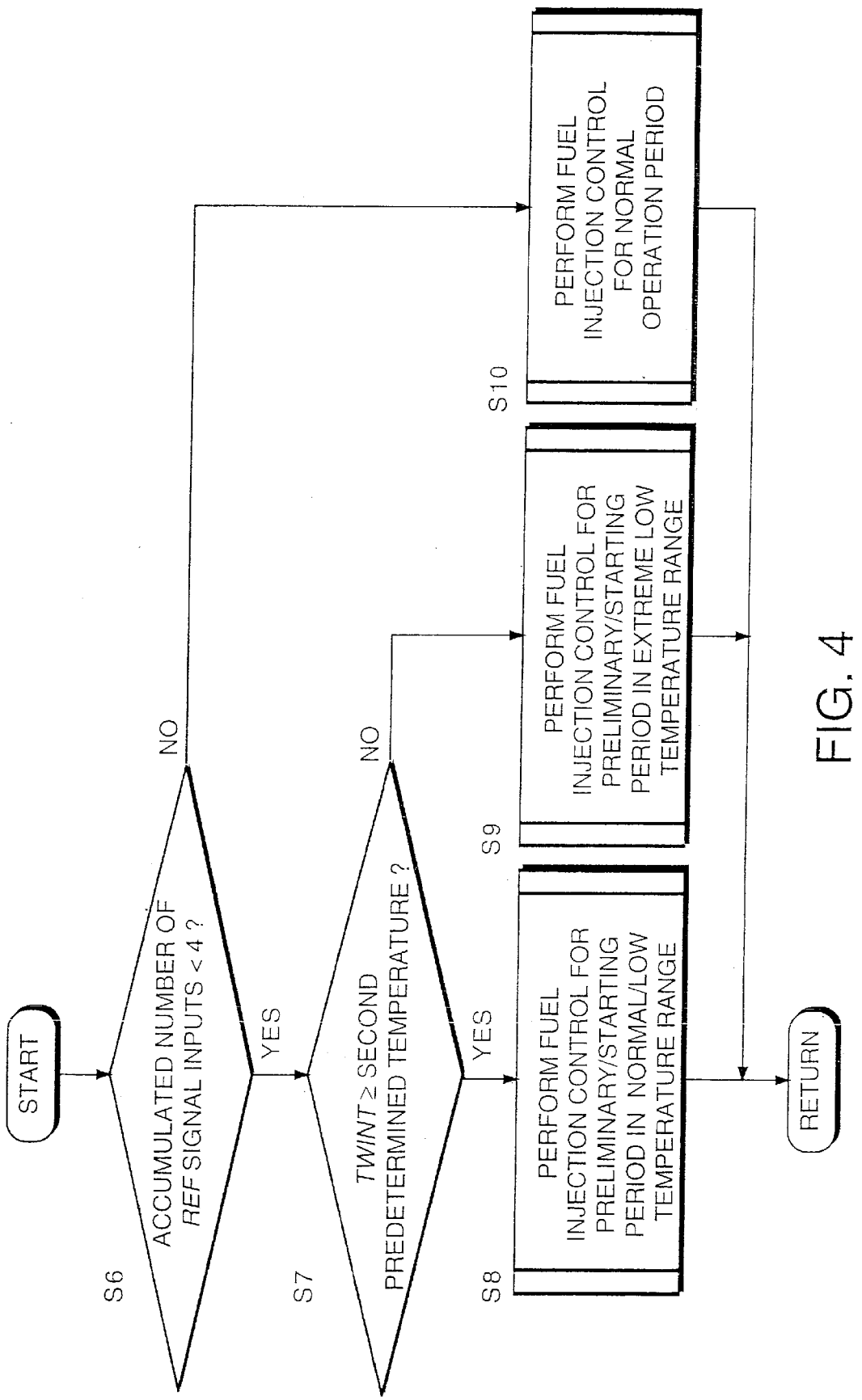
FIG. 4 is a flowchart of a main control routine for fuel injection control performed by the controller.
Figure 5:
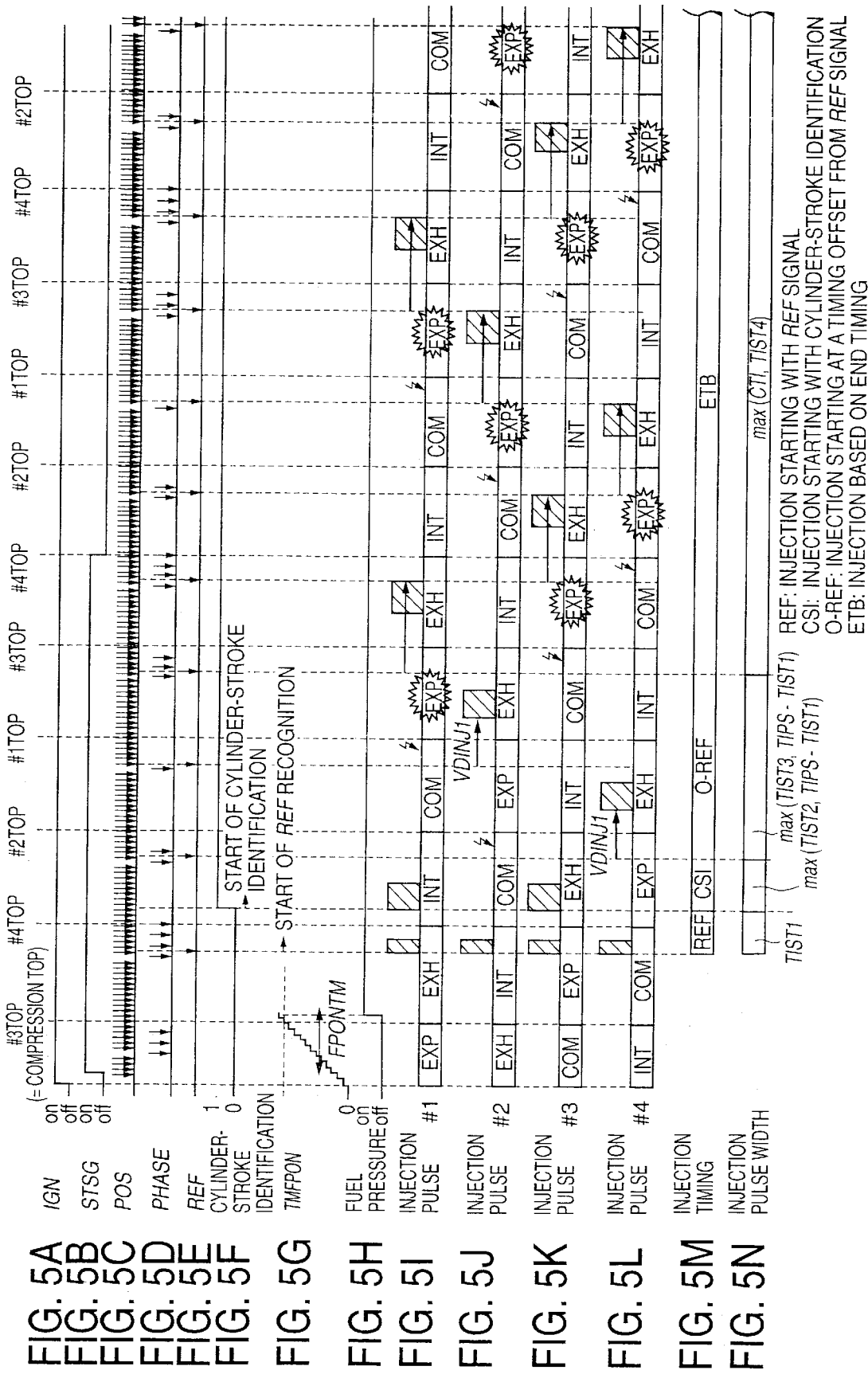
FIGS. 5A–5N are a timing chart describing a fuel injection pattern in a normal temperature region performed by the controller.
Figure 6:
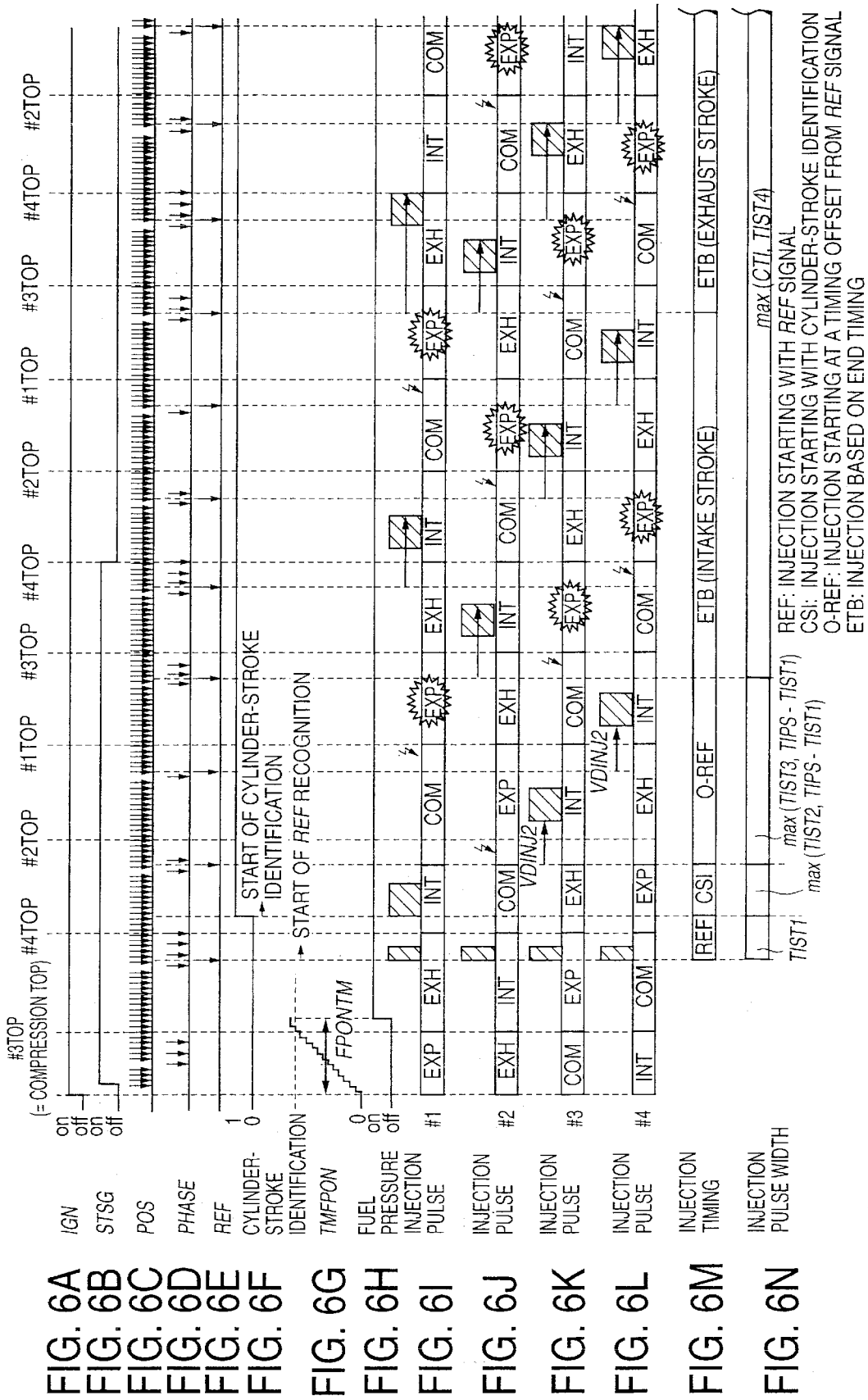
FIGS. 6A–6N are a timing chart describing a fuel injection pattern in a low temperature region performed by the controller.

Next fuel injection control during engine startup will be described referring to the flowchart in FIG. 3 and FIG. 4. FIG. 3 and FIG. 4 shows a main control routine executed by the controller 1 at an interval of 10 milliseconds. The timing charts shown in FIG. 5 and FIG. 6 show the state of various components over time during startup control.

In a step S1 in FIG. 3, the elapsed time TMFPON after the ignition signal ING is placed in the ON position is counted up and compared with a reference value FPONTM. The controller 1 immediately terminates the routine without proceeding to subsequent steps until the elapsed time TMFPON reaches the reference value FPONTM.

The set reference value FPONTM corresponds to the drive time of the fuel pump required to increase the fuel pressure in the fuel pipe to a steady-state pressure. This set time prevents a shortfall in the fuel injection amount during initial fuel injection after cranking startup.

Once the elapsed time TMFPON reaches the reference value FPONTM, the routine proceeds to a step S2 and the routine shifts to fuel/ignition control during cranking.

In a step S2, when the first cylinder-stroke identification signal or the first REF signal is input after the time elapse for fuel pressure increase, the routine proceeds to a step S3. In the step S3, control is performed so that the fuel injection pattern is determined to be simultaneous injection to all cylinders or sequential injection through the stroke sequence to each cylinder or each cylinder group.

In the step S2, when the first REF signal or the cylinder-stroke identification signal has not been input, the routine proceeds to a step S4 and the calculation of the fuel injection pulse width is performed at a control cycle of 10 milliseconds for example. In a step S5, ignition control is performed as described hereafter.

FIG. 4 shows a main control routine for the fuel injection pattern after the time elapse for the fuel pressure increase when starting cranking as executed in the step S3.

In a step S6, when the input frequency of the REF signal is compared with a predetermined value (for a four-cylinder engine, this is set to a value of four and is a value which depends on the number of cylinders). This is in order to determine whether or not an initial startup period has elapsed. If the input frequency of the REF signal is greater than or equal to the predetermined value, it means that the initial startup period is finished and control has entered the normal injection period. In this case, the routine proceeds to a step S10 and fuel injection control is executed using the fuel injection completion timing as a reference.

When the input frequency of the REF signal is determined to be less than a predetermined value, the routine proceeds to a step S7. In the step S7, the water temperature TWINT detected by the cooling water temperature sensor 15 at cranking startup is compared with a reference value corresponding to a predetermined water temperature of −15 degrees C.

When the water temperature TWINT is lower than the reference value, the routine proceeds to a step S9 and fuel injection control is executed based on the reference value for the fuel injection startup timing during extremely low temperatures.

In contrast, when the water temperature TWINT is greater than or equal to the predetermined reference value, the routine proceeds to a step S8 and a control routine is performed using the reference value for the fuel injection startup timing reference for normal water temperatures.

FIG. 5 shows the fuel injection control when the water temperature at cranking startup is normal. After the time elapse for fuel pressure increase, as shown in FIG. 5E, when the first REF signal is input, a predetermined fuel amount is injected simultaneously into all cylinders in synchrony with the REF signal input timing as shown in FIGS. 5I, J, K and L. In FIG. 5F, when the first cylinder identification signal is input after the time elapse for fuel pressure increase, an injection operation is performed on the group of cylinders undergoing an intake stroke or an exhaust stroke in synchrony with the input timing of the cylinder identification signal.

When the inputted signal after the time elapse for the fuel pressure increase is neither the first REF signal or a cylinder identification signal, that is to say, when the first fuel injection has already been performed, as shown in FIGS. 5I, J, K, and L, fuel injection is performed on the next cylinder in order after passing through a crank angle set by the command value VDINJ1 on the basis of the input timing of the REF signal. However fuel injection is not performed with respect to cylinders which have already undergone group injection. The command value VDINJ1 is set so that the fuel injection operation performed at this time is performed during the exhaust stroke.

FIG. 6 shows the fuel injection control routine during extremely low temperatures when the water temperature at cranking startup is less than TWINT.

After fuel pressure increase time has elapsed, as shown in FIG. 6E, when the first REF signal is inputted, as shown in FIGS. 6I, J, K and L, simultaneous injection is performed on all cylinders in synchrony with the input timing of the REF signal. Furthermore when the first cylinder identification signal after the fuel pressure increase time has elapsed is input as shown in FIG. 6F, a fuel injection operation is performed on cylinders undergoing an intake stroke in synchrony with the input timing of the cylinder identification signal.

When the inputted signal is neither the first REF signal after the time elapse for fuel pressure increase or the first cylinder identification signal, as shown in FIGS. 6I, J, K, and L, fuel injection is performed on the next cylinder in order after elapse of the crank angle set by the command value VDINJ2 on the basis of the input timing of the REF signal. The command value VDINJ2 is set so that the fuel injection operation performed at this time is performed during the intake stroke.

Fuel injection to all cylinders as shown in FIG. 5 and FIG. 6 comprises supply of an amount of fuel which can not injected during a first injection operation immediately after cylinder identification due to the above characteristics of the fuel injector 8. Thus it is sometimes the case that an injection operation is not required as a result of temperature conditions or the current state of the fuel injector 8. Furthermore irrespective of the water temperature at cranking startup, after the input frequency of the REF signal reaches a predetermined value, the routine shifts to injection completion timing reference control. Consequently sequential fuel injection is performed in synchrony with the stroke position of each cylinder so that injection is completed at a predetermined timing during the exhaust stroke of the cylinder.

In this manner, when fuel injection is performed in synchrony with the cylinder identification timing for each cylinder, preferred exhaust emission control and startability are obtained by optimizing the air-fuel ratio of each cylinder. However as described above, it is preferred that the ignition timing is more accurately controlled in order to ensure the above result. Next ignition timing control for that purpose will be described.

Figure 7:
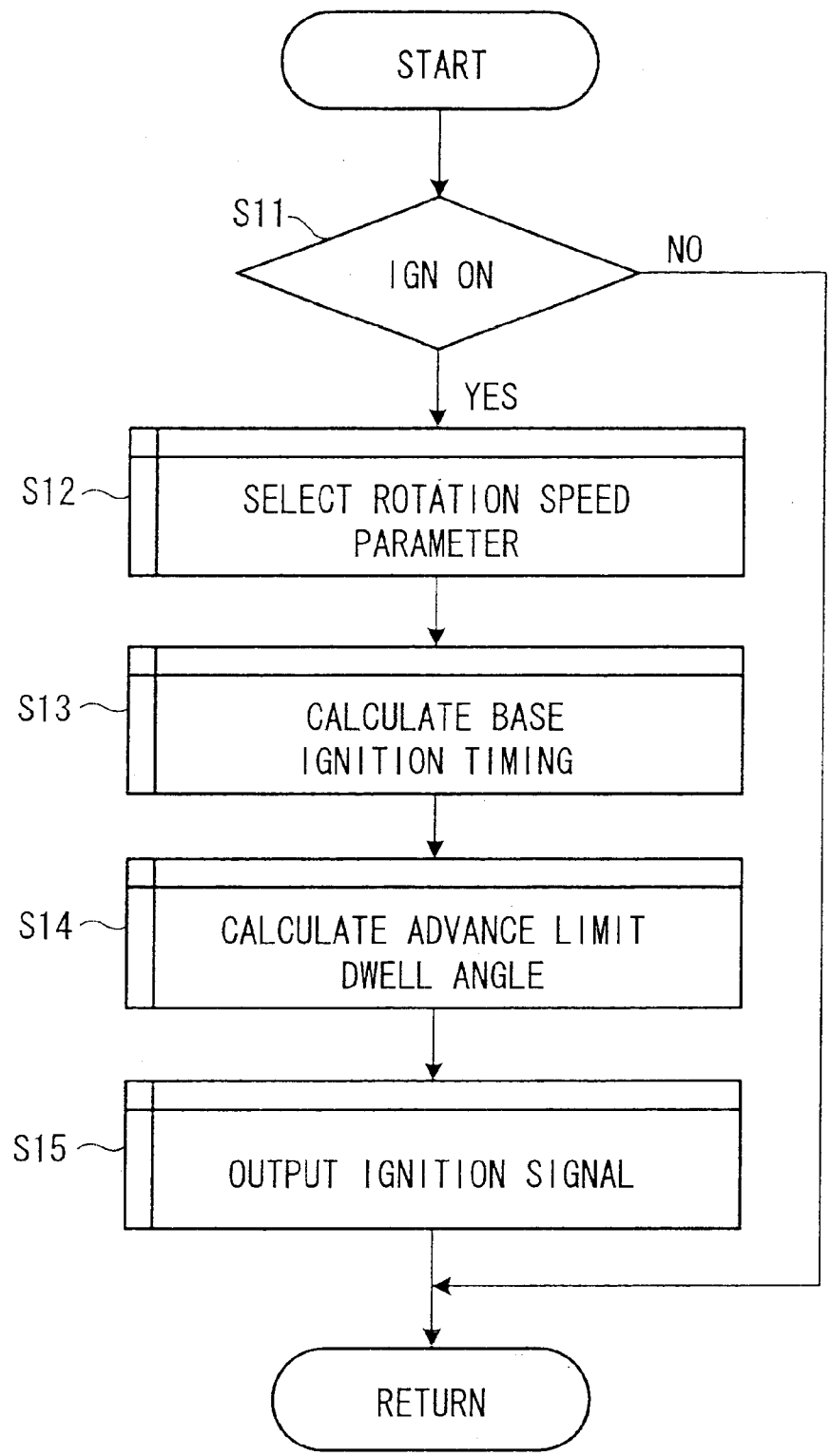
FIG. 7 is a flowchart describing a main routine for ignition control performed by the controller.

FIG. 7 shows a main control routine for ignition control executed at a fixed repetition period by the controller 1. This control is executed at a period of 10 milliseconds.

In a step S11, the state of the ignition switch is determined and when the ignition signal ING is in the ON position, the calculation of the ignition timing is performed in the step S12 and subsequent steps. When the ING signal is not in the ON position, the routine is immediately terminated.

In a step S12, either a rotation speed expressed by the POS signal which has a rapid updating period or the rotation speed expressed by the REF signal which has a slow updating period is selected as the rotation speed parameter used in the calculation of the ignition timing. The selection of the rotation speed parameter will be described in detail below.

When the routine proceeds to a step S13, the basic ignition timing is calculated using a rotation speed selected in the step S12.

The calculation of the basic ignition timing is performed by referring to a table defining a basic ignition timing with respect to load and rotation speed of the engine for example.

In a step S14, a set value for the advance limit and the dwell angle are determined in order to restrict the maximum advance for a single control cycle during a transient condition (including startup state) or by a steady-state operating condition.

Then in a step S15, an ignition signal is output based on the dwell angle and the advance limit, and the basic ignition timing set in the above manner.

Figure 8:
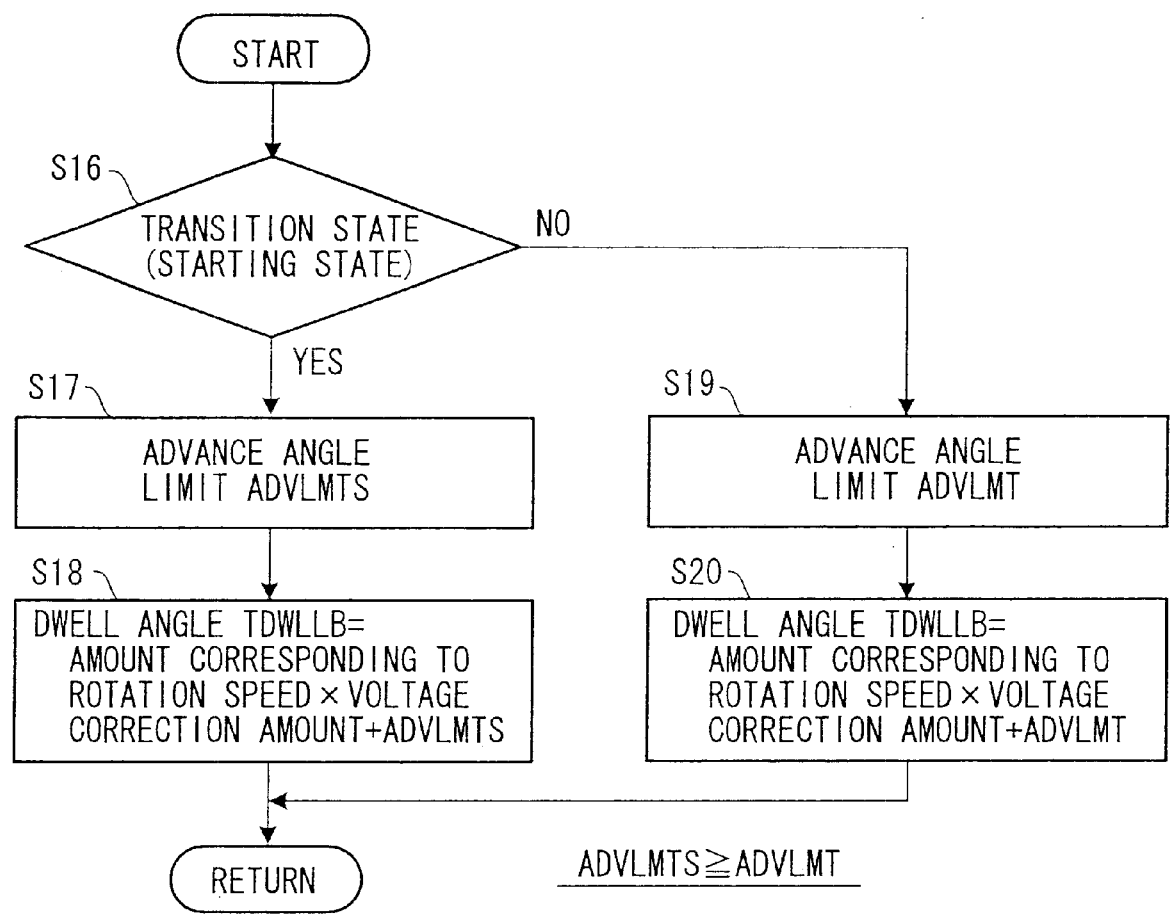
FIG. 8 is a flowchart describing a subroutine for ignition control performed by the controller.
Figure 9:
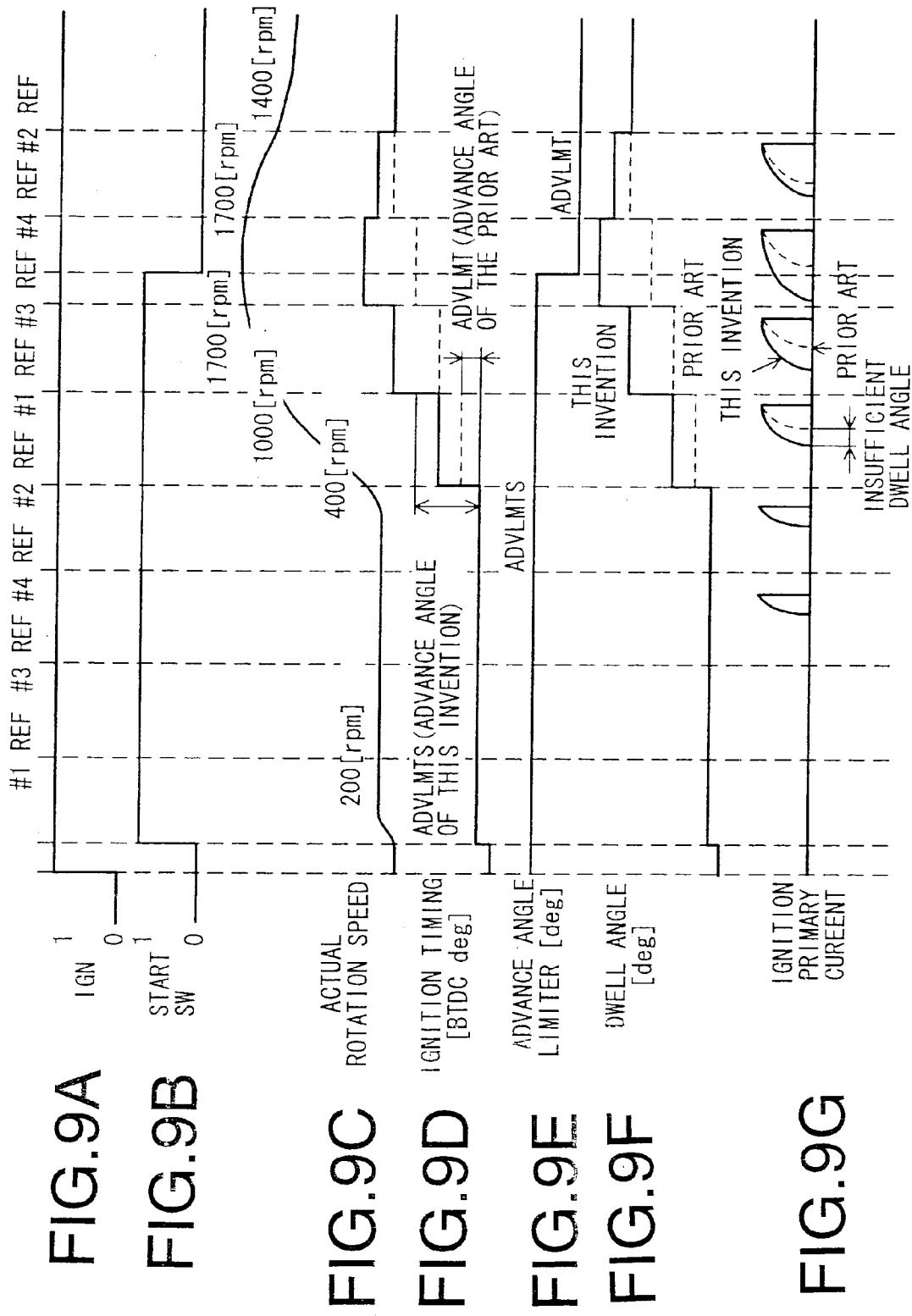
FIGS. 9A–9G are a timing chart describing an ignition pattern during the ignition control shown in FIG. 8 which is performed by the controller.

FIG. 8 is a subroutine for setting the current-carrying angle and the advance limit in the step S14 performed by the controller 1. FIG. 9 is a timing chart representing the operation based on this control.

In FIG. 8, in a step S16, it is determined whether or not the vehicle is in a startup state. This determination is performed based on whether the ignition signal ING and the start signal STSG are in the ON position.

When it is determined that the vehicle is in a startup state, the routine proceeds to a step S17 and ADVLMTS is selected as the advance limit between each REF signal. In states other than a startup state, that is to say, when it is determined that the vehicle is operating in a steady-state condition, ADVLMT is selected as the advance limit between each REF signal.

ADVLMT normally corresponds to the general advance limit. The values ADVLMTS and ADVLMT display a relationship such that ADVLMTS is greater than ADVLMT. The limits are pre-stored in the memory of the controller 1.

When ADVLMTS is selected, the routine proceeds to a step S18 and the dwell angle TDWLLB is calculated. This calculation process comprises multiplying the voltage correction by the rotation speed equivalence value set by looking up a table in response to the engine rotation speed and then adding the advance limit ADVLMTS selected in a step S17 to the resulting value. However the voltage correction is a value which increases as the battery voltage decreases.

Furthermore when it is determined that the vehicle is operating in conditions other than startup in a step S16 and when ADVLMT is selected in a step S19, the dwell angle TDWLLB is calculated which corresponds to the current-carrying period for the ignition current in a step S20. This value TDWLLB is calculated by multiplying the voltage correction with the rotation speed equivalence value and then adding the advance limit ADVLMT selected in the step S19.

Since ADVLMTS which is larger than ADVLMT is selected as the advance limit during startup conditions, the dwell angle takes a larger value during startup conditions.

FIG. 9 shows ignition timing characteristics in engine startup conditions when performing the above process.

As shown in FIGS. 9C, D, when the rotation speed increases during startup, ADVLMTS is selected as the advance limit. Since this value is larger than ADVLMT which is the normal advance limit as shown by the broken line, a large advance is possible since the ignition timing set based on the rotation speed is not restricted by the limit.

Consequently it is possible to perform an advancing operation towards an optimal ignition timing in response to the increase in the rotation speed during startup more rapidly than the conventional example shown by the broken line.

As shown in FIGS. 9F, G, the value for the dwell angle is also set to a large dwell angle. In this manner, it is possible to ensure ignition of the air-fuel mixture during engine startup conditions and generate a sufficiently large torque. Thus it is possible to improve startability and to prevent flameout or incomplete combustion as well as preventing adverse effects on exhaust emission control resulting from these factors.

Figure 10:
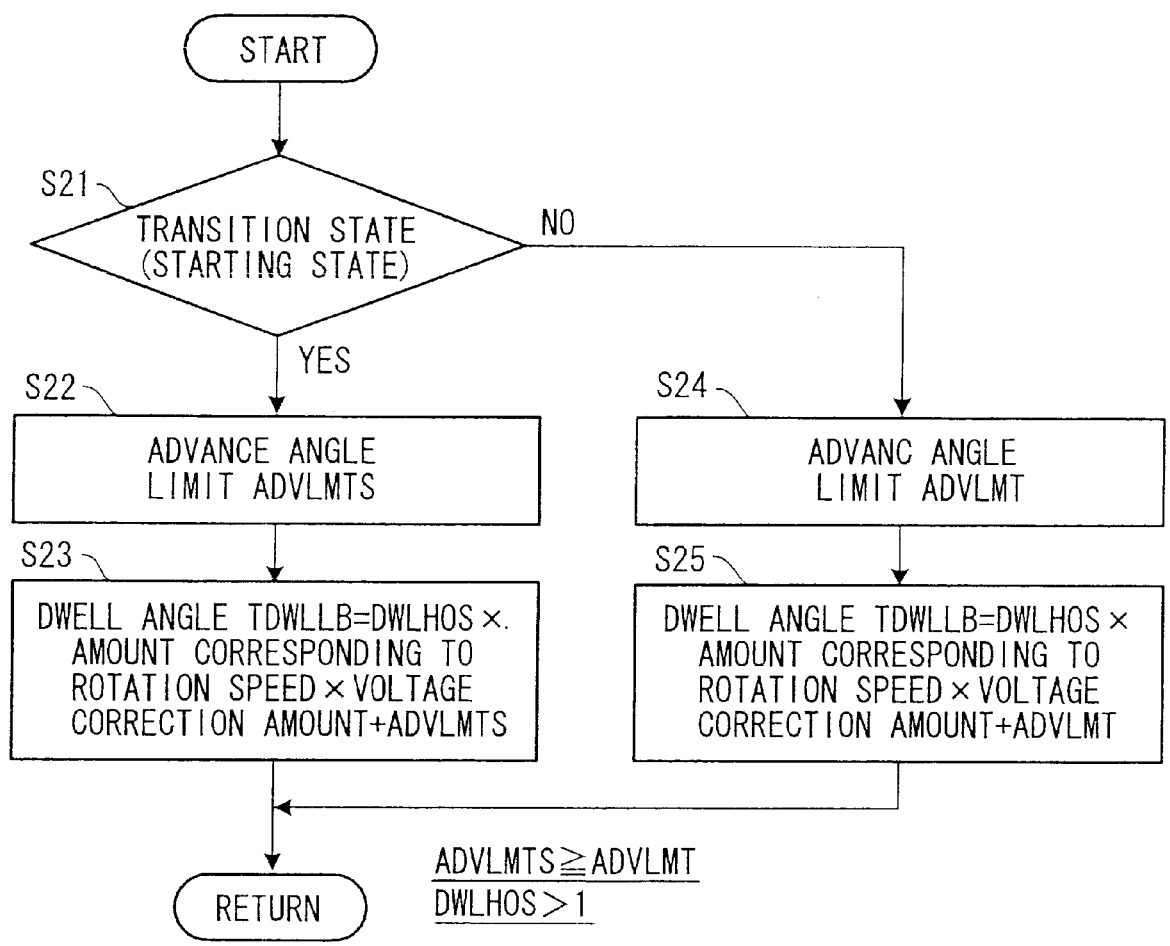
FIG. 10 is a flowchart describing the subroutine for another embodiment of ignition control performed by the controller.
Figure 11:
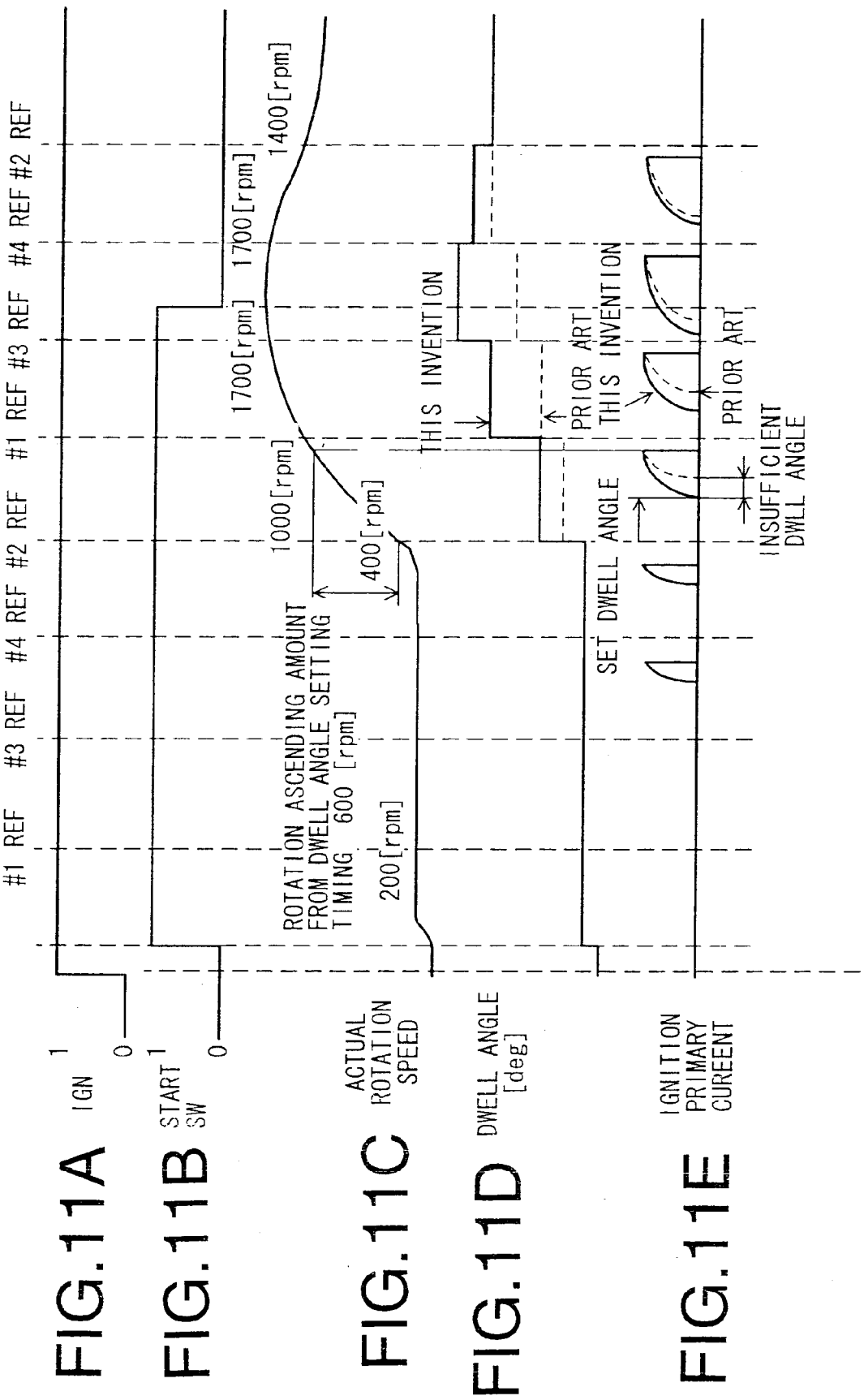
FIGS. 11A–11E are a timing chart describing an ignition pattern during the ignition control shown in FIG. 10 performed by the controller.

FIG. 10 is a subroutine for another embodiment performed by the controller 1 related to setting the dwell angle and the advance limit. FIG. 11 is a timing chart expressing an operation based on that control.

In FIG. 10, the steps S21, S22, S24, S25 are the same as the steps S16, S17, S19, S20 in FIG. 8.

The process in the step S23, that is to say, the process for calculating the dwell angle TDWLLB after setting the transient advance limit ADVLMTS is different from the step S18 in FIG. 8.

That is to say, in a step S23, a correction coefficient DWLHOS (where DWLHOS is greater than one) is set and this value is multiplied by the voltage correction and the rotation speeds equivalence value set in response to the engine rotation speed. The advance limit ADVLMTS set in a step S22 is then added to these values.

Consequently it is possible for the dwell angle TDWLLB to take even larger values as a result of applying the correction coefficient DWLHOS.

Referring to FIG. 11, as shown in FIGS. 11D, E, the dwell angle takes a sufficiently large value with the result that the dwell angle is set to a value which contains a margin which also take into account conditions under which the rotation speed increases rapidly such as during engine startup. Consequently ignition operations are ensured.

The process of selecting the rotation speed parameter in the step 12 shown in FIG. 7 as executed by the controller 1 will be described in detail below.

Figure 12:
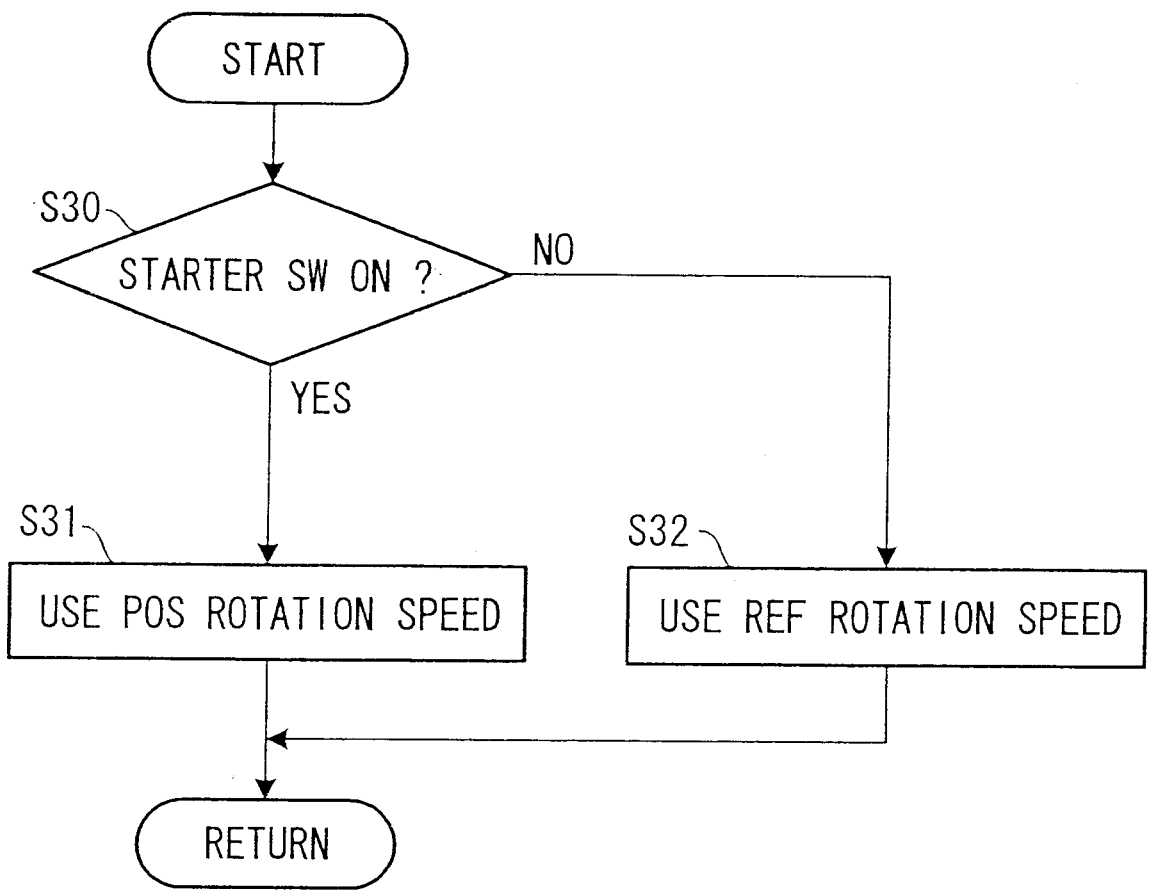
FIG. 12 is a flowchart describing a subroutine for yet another embodiment of ignition control performed by the controller.
Figure 13:
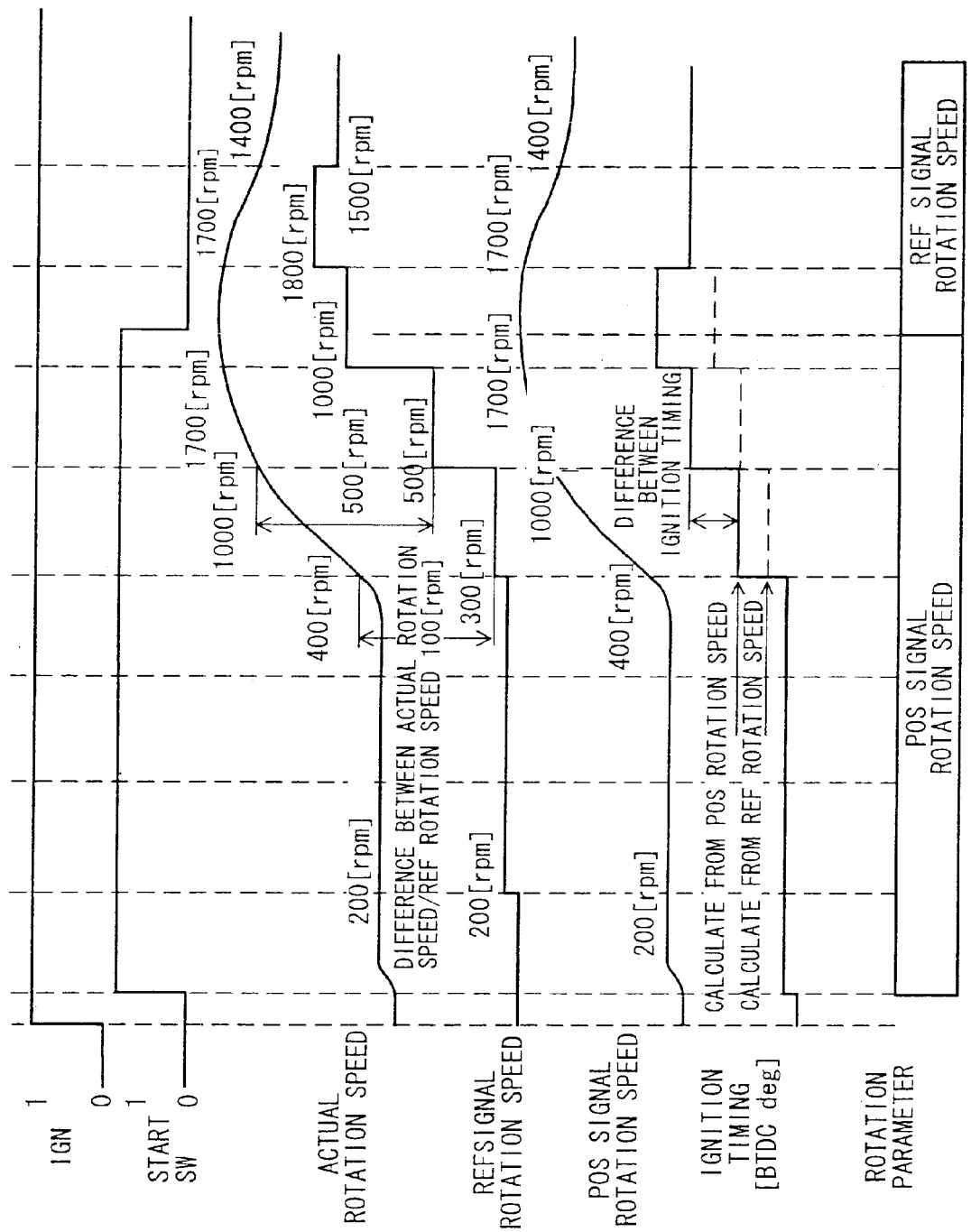
FIGS. 13A–13G are a timing chart describing an ignition pattern during the ignition control shown in FIG. 12 performed by the controller.

FIG. 12 shows a subroutine for embodiment of ignition control executed by the controller. FIG. 13 is a timing chart showing an operation based on the above control.

In FIG. 12, firstly in a step S30, it is determined whether or not the starter signal STSG from the ignition switch 13 is in the ON position.

When the starter signal STSG is in the ON position, the routine proceeds to a step S31 and the rotation speed (hereafter referred to as the "POS rotation speed") calculated based on the output period of the POS signal from the crank angle sensor 9 is used as the rotation speed parameter from setting the ignition timing.

That is to say, the POS rotation speed is used as a rotation speed parameter for setting the ignition timing in the process performed in the step S13 and subsequent steps as shown in FIG. 7.

In contrast, when the starter signal STSG is in the OFF position, the routine proceeds to a step S32 and the rotation speed (hereafter referred to as the "REF rotation speed") calculated based on the output period of the REF signal from the crank angle sensor 9 is used as the rotation speed parameter from setting the ignition timing.

The POS signal is output per unit rotational angle of the crankshaft 10, for example at a period of 1 deg. The REF signal is outputted at a pre-set reference position of the crankshaft 10. Consequently under operating conditions such as during startup when the rotation speed increases rapidly, the POS rotation speed which is updated at a more rapid cycle expresses a rotation speed which is closer to the real rotation speed than the REF rotation speed which is updated at a slower cycle.

Thus when the POS rotation speed is used during startup conditions as the rotation speed parameter for setting the ignition timing, it is possible to perform a setting to an ignition timing which is closer to an optimal ignition timing for the engine rotation speed.

FIG. 13F shows an ignition timing calculated based on the POS rotation speed and the REF rotation speed. A larger advance can be applied to an ignition timing calculated based on the POS rotation speed. Thus it is possible for the ignition timing as well as the dwell angle to approach the required value.

Figure 14:
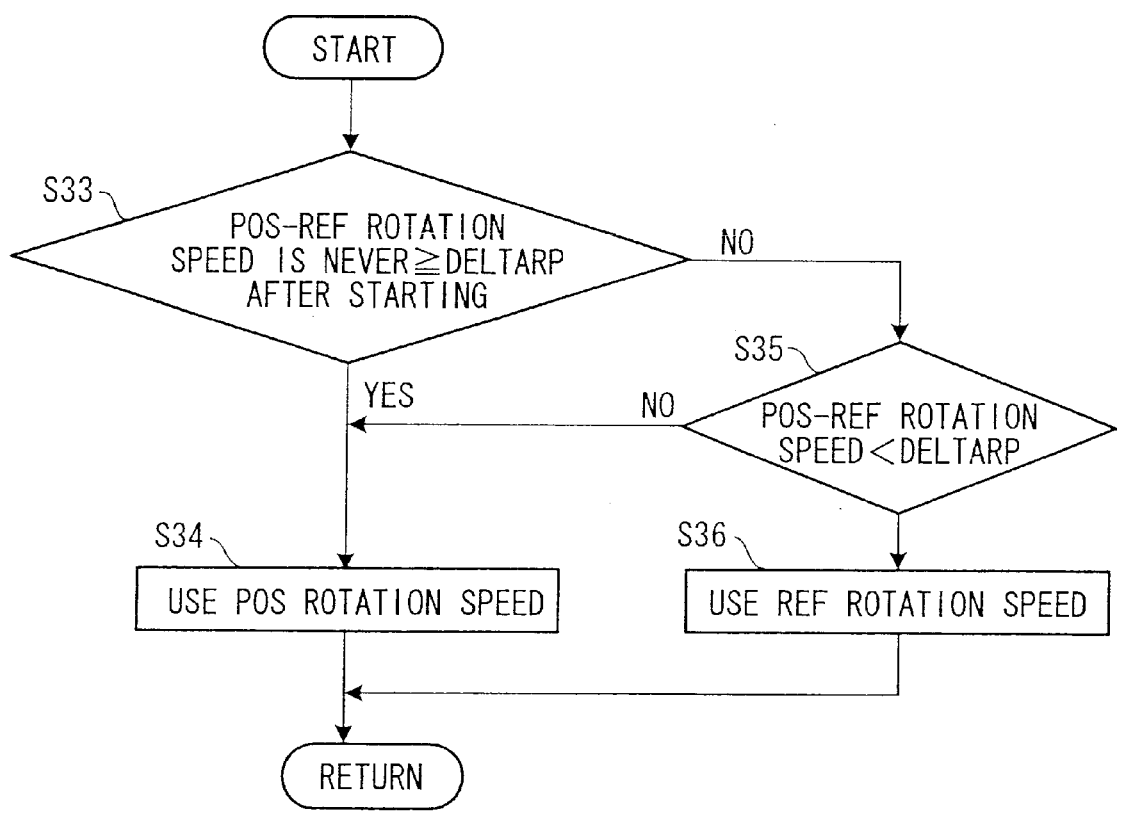
FIG. 14 is a flowchart describing a subroutine for yet another embodiment of ignition control performed by the controller.
Figure 15:
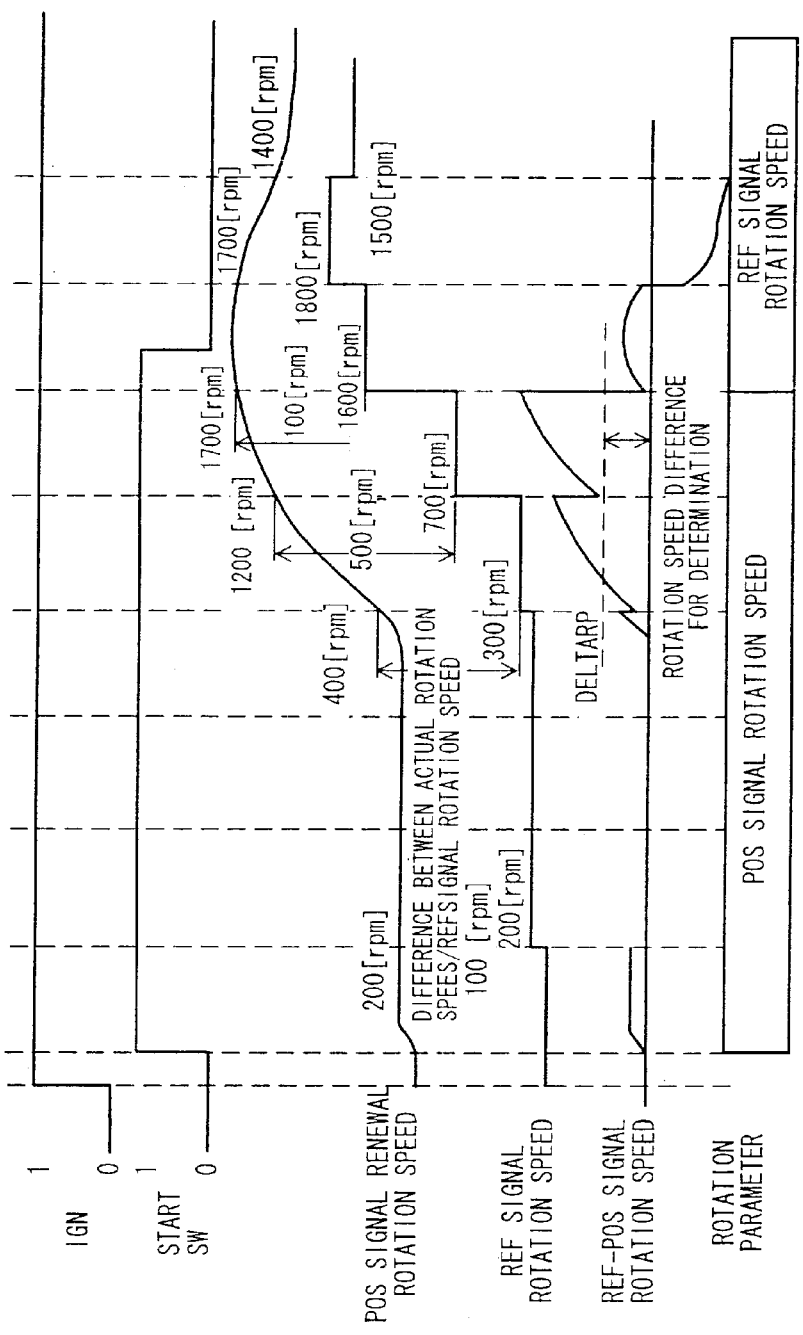
FIGS. 15A–15F are a timing chart describing an ignition pattern during the ignition control shown in FIG. 14 performed by the controller.

FIG. 14 shows a subroutine for another embodiment of a process for selecting the rotation speed parameter performed by the controller 1. FIG. 15 is a timing chart describing an operation based on this control.

In FIG. 14, in a step S33, it is determined whether or not the differential of the POS rotation speed and the REF rotation speed has taken a larger value than the predetermined value on any occasion after the engine was started. That is to say, it is determined whether the POS rotation speed–REF rotation speed is greater than or equal to DELTARP.

As shown in FIGS. 15C, D, E, the period in which the differential is small, corresponds to a region after engine startup until the rotation speed starts to increase. Thus the predetermined value DELTARP is a value which corresponds to a value at which the variation in the engine rotation speed is not very high.

When the differential between the POS rotation speed and the REF rotation speed is small, the routine proceeds to a step S34 and the POS rotation speed is selected as the rotation speed parameter.

In a step S33, when it is determined that relationship POS rotation speed–REF rotation speed is greater than or equal to DELTARP has been satisfied even on a single occasion, the routine proceeds to a step S35. In the step S35, it is determined whether or not POS rotation speed–REF rotation speed is smaller than DELTARP.

If the relationship POS rotation speed–REF rotation speed is greater than or equal to DELTARP is satisfied, it shows that the rotation speed is increasing. Consequently the routine proceeds to a step S34, and the POS rotation speed is selected as a rotation speed parameter. As a result, even during an increase in the rotation speed, it is possible to improve the response characteristics with which the ignition timing is advanced by calculating the ignition timing based on the POS rotation speed.

In the step S35, when the POS rotation speed–the REF rotation speed is smaller then DELTARP, the routine proceeds to a step S36 and the REF rotation speed is selected as a rotation speed parameter.

This state corresponds to a region in FIG. 15 in which the increase in the rotation speed has stopped and the differential of the REF rotation speed and the POS rotation speed has decreased. As shown in FIG. 15E, while the engine rotation speed is increasing, the differential between the two rotation speeds is large. When the rotation speed decreases, the REF rotation speed is larger than the POS rotation speed and the rotation speed differential takes a negative value.

In regions in which the rotation speed differential is small, even when the ignition timing is calculated based on the REF rotation speed, it is possible to approximate the required ignition timing.

Figure 16:
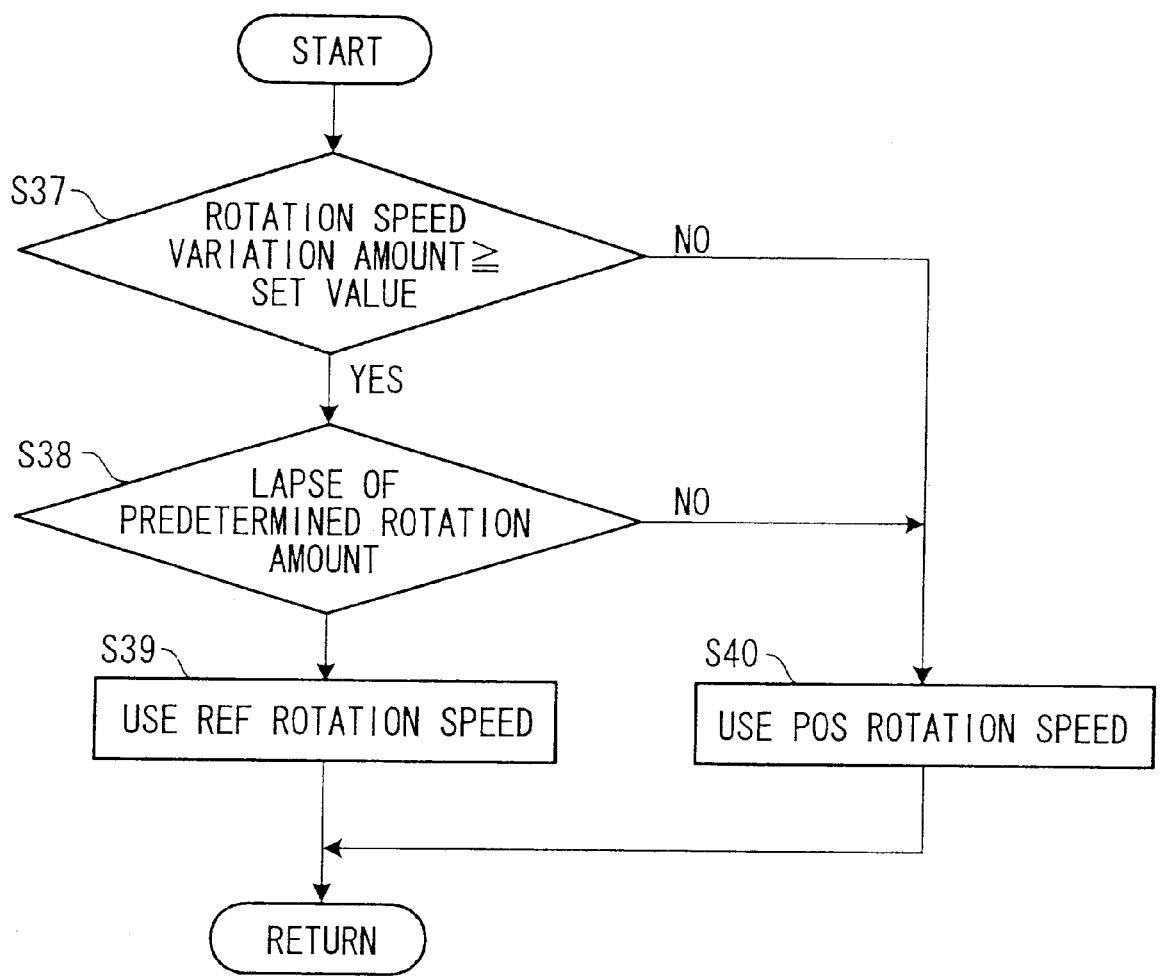
FIG. 16 is a flowchart describing yet another embodiment of ignition control performed by the controller.
Figure 17:
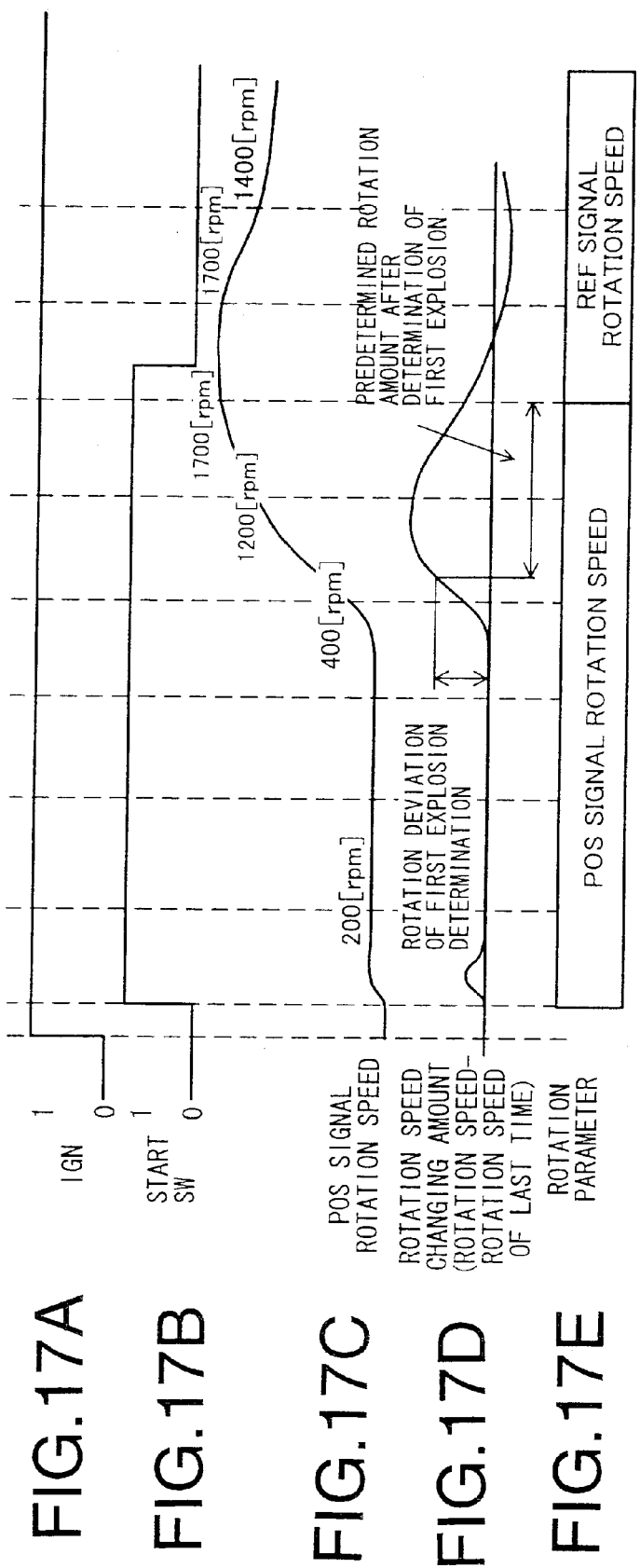
FIGS. 17A–17E are a timing chart describing an ignition pattern during the ignition control shown in FIG. 16 performed by the controller.

FIG. 16 shows a subroutine for another embodiment of a process of selecting a rotation speed parameter performed by the controller 1. FIG. 17 is a timing chart describing an operation based on the above control routine.

In this process, a differential between the POS rotation speed, and the REF rotation speed is mainly generated during startup conditions. Thus as shown in FIG. 17D, the degree of variation in the rotation speed, that is to say, the differential of the rotation speed is, used to determine a initial combustion being startup of combustion operations. Selection of the rotation speed parameter is performed by determining whether or not initial combustion has occurred.

In FIG. 16, the amount of variation in the rotation speed as represented by the differential of the rotation speed in the step S37 is compared with the predetermined set value. The set value corresponds to a rotational acceleration at which the engine rotational acceleration undergoes independent motion due to initial combustion.

When the amount of variation in the rotation speed is not greater than or equal to a set value, the routine proceeds to a step S40 and the POS rotation speed is selected as the rotation speed parameter.

When the amount of variation in the rotation speed is greater than or equal to a set value, the routine proceeds to a step S38 and the rotation speed of the crankshaft after the amount of variation in the rotation speed becomes greater than or equal to a set value is measured. The measured rotation speed is compared with a predetermined value. This predetermined value is set to a value which corresponds to the period after initial combustion until the engine rotation speed reaches an idle rotation speed.

As long as this period has not elapsed, the routine proceeds to a step S40 and the POS rotation speed is maintained as the parameter for rotation speed.

In contrast, when the above period has elapsed, the routine proceeds to a step S39 and the REF rotation speed is selected a the rotation speed parameter.

In this manner, during startup conditions in which the rotation speed undergoes a large variation, when the POS rotation speed is used as the rotation speed parameter for setting the ignition timing, it is possible to obtain a value which more closely approximates an optimal ignition timing for the engine rotation speed.

Figure 18:
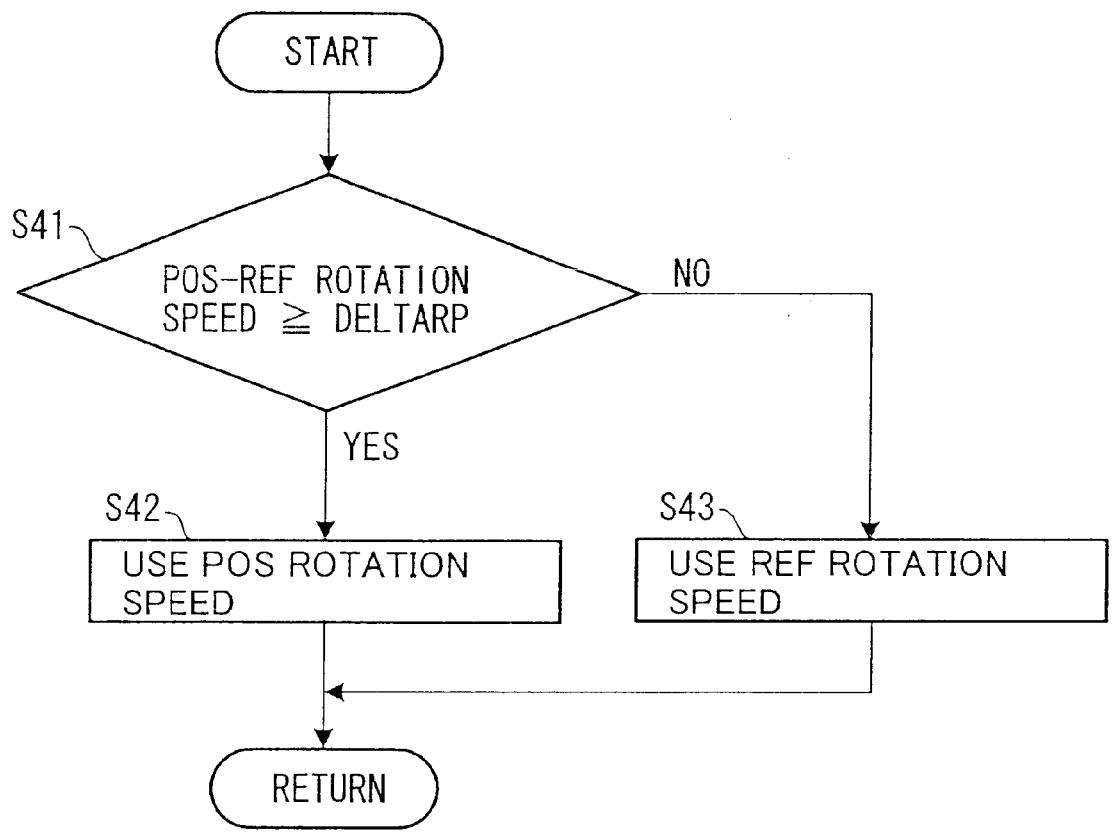
FIG. 18 is a flowchart describing yet another embodiment of ignition control performed by the controller.

FIG. 18 is a flowchart for another embodiment of selecting a rotation speed parameter executed by the controller 1 during transient operating conditions other than during startup.

In each embodiment above, a selection process is described for the rotation speed parameter in order to set the ignition timing under engine startup conditions. However during conditions other than startup, the rotation speed undergoes large variations during acceleration for example. During this type of transient operation, it is possible to realize suitable ignition timing control by selecting the rotation speed parameter in the above manner.

In a step S41 shown FIG. 18, a value obtained by subtracting the REF rotation speed from the POS rotation speed is compared with the pre-set reference value DELTARP. The reference value DELTARP is the same as that shown in FIG. 14 and is a value at which there is not a large variation in the engine speed.

When the rotation speed differential is less than the reference value, the routine proceeds to a step S43, and the REF rotation speed is used as the rotation speed parameter used in order to set the ignition timing (step S43).

In contrast, when the rotation speed differential is larger than the reference value, that is to say, when fluctuation in the rotation speed is high, in a step S42, the POS rotation speed is used as the rotation speed parameter for setting the ignition timing.

Thus under conditions other than engine startup conditions, in other words, during transient conditions such as engine acceleration when fluctuation in the rotation speed is high, it is possible to make further improvements to the ignition timing by setting the ignition timing based on the POS ignition timing. The entire contents of Japanese Patent Application P2001-246499(filed Aug. 15, 2001) is incorporated herein by reference.

This invention is not limited to the above embodiments and may be changed in various ways within the scope of the inventive concept.

What is claimed is:

1. An ignition control device for an internal combustion engine, the internal combustion engine comprising a spark plug provided in a combustion chamber and an ignition coil supplying an ignition current to the spark plug, the ignition coil controlling an ignition current supplied to the spark plug based on a supplied primary current; the ignition control device comprising:
   a first sensor detecting a rotation speed of the engine crankshaft;
   a second sensor detecting a transient operating state of the engine; and
   a controller which functions to
      determine a transient engine operating state based on the output of the second sensor;
      calculate the basic ignition timing based on the rotation speed;
      set an advance limit which is the maximum value of the advance on the ignition timing to a different value during a transient operating state and during a steady-state operating state, the value during a transient operating state being the larger value;
      set the ignition timing by using the limit to restrict the advance on the basic ignition timing, the basic ignition timing being calculated based on the rotation speed;
      calculate a dwell angle comprising the period of application of an ignition current in response to the rotation speed; and
      control the primary current supplied to the ignition coil based on the ignition timing and the dwell angle.

2. The ignition control device as defined by claim 1, wherein the controller functions to increase the dwell angle for a transient operating state to a value greater than the value for a steady-state operating state.

3. The ignition control device as defined by claim 2, wherein the controller functions to increase the dwell angle for a transient operating state based on the limit for a transient operating state.

4. The ignition control device as defined by claim 1, wherein the first sensor is a sensor which outputs a REF signal showing a reference rotation position of the crankshaft and a POS signal showing the rotation amount.

5. The ignition control device as defined by claim 4, wherein the controller functions to calculate a basic ignition timing using a rotation speed represented by the POS signal instead of the rotational speed represented by the REF signal when detecting a transient operating state.

6. The ignition control device as defined by claim 5, wherein the controller functions to calculate a basic ignition timing using a rotation speed represented by the POS signal instead of a rotation speed represented by the REF signal, after the differential between the rotation speed represented by the REF signal and the rotation speed represented by the POS signal is greater than or equal to a reference value.

7. The ignition control device as defined by claim 5, wherein the controller functions to calculate an amount of variation in the rotation speed; compare the calculated amount with a value corresponding to the amount of variation in the rotation speed at initial engine combustion; and calculate the basic ignition timing based on a rotation speed represented by the REF signal when the rotation frequency of the crankshaft after the calculated value exceeds the initial combustion equivalence value is greater than or equal to a reference value.

8. The ignition control device as defined by claim 5, wherein the second sensor is an ignition switch for detecting engine startup.

9. The ignition control device as defined by claim 8, wherein the controller functions to calculate a basic ignition timing using a rotation speed represented by the POS signal instead of the rotational speed represented by the REF signal when detecting a startup condition.

10. The ignition control device as defined by claim 9, wherein the controller functions to calculate a basic ignition timing using a rotation speed represented by the POS signal instead of a rotation speed represented by the REF signal, after the differential between the rotation speed represented by the REF signal and the rotation speed represented by the POS signal is greater than or equal to a reference value.

11. An ignition control device for an internal combustion engine, the internal combustion engine comprising a spark plug provided in a combustion chamber and an ignition coil supplying an ignition current to the spark plug, the ignition coil controlling an ignition current supplied to the spark plug based on a supplied primary current; the ignition control device comprising:
   means for detecting a rotation speed of the engine crankshaft;
   means for detecting a transient operating state of the engine;
   means for determining a transient engine operating state based on the output of the second sensor;
   means for calculating the basic ignition timing based on the rotation speed;
   means for setting an advance limit which is the maximum value of the advance on the ignition timing to a different value during a transient operating state and during a steady-state operating state, the value during a transient operating state being the larger value;
   means for setting the ignition timing by using the limit to restrict the advance on the basic ignition timing, the basic ignition timing being calculated based on the rotation speed;
   means for calculating a dwell angle comprising the period of application of an ignition current in response to the rotation speed; and
   means for controlling the primary current supplied to the ignition coil based on the ignition timing and the dwell angle.

* * * * *